(12) United States Patent
Santana-Gallego

(10) Patent No.: US 10,040,572 B2
(45) Date of Patent: Aug. 7, 2018

(54) AIRCRAFT HAVING AT LEAST ONE CONTROL DEVICE FOR CONTROLLING INFLATION OF AN INFLATABLE SAFETY BAG, AND AN ASSOCIATED METHOD OF CONTROLLING INFLATION OF AN INFLATABLE SAFETY BAG

(71) Applicant: AIRBUS HELICOPTERS, Marignane (FR)

(72) Inventor: Tomas Santana-Gallego, Munich (DE)

(73) Assignee: AIRBUS HELICOPTERS (FR)

( * ) Notice: Subject to any disclaimer, the term of this patent is extended or adjusted under 35 U.S.C. 154(b) by 0 days.

(21) Appl. No.: 15/204,140

(22) Filed: Jul. 7, 2016

(65) Prior Publication Data

US 2017/0008641 A1 Jan. 12, 2017

(30) Foreign Application Priority Data

Jul. 8, 2015 (FR) ..................... 15 01443

(51) Int. Cl.
*B64D 45/00* (2006.01)
*B64D 11/06* (2006.01)
(Continued)

(52) U.S. Cl.
CPC .......... *B64D 45/00* (2013.01); *B64D 11/0619* (2014.12); *B64D 11/0621* (2014.12);
(Continued)

(58) Field of Classification Search
None
See application file for complete search history.

(56) References Cited

U.S. PATENT DOCUMENTS 5,085,464 A * 2/1992 Behr ................... B60R 21/0176
180/282
5,547,149 A * 8/1996 Kalberer ................ B64D 25/00
244/121

(Continued)

FOREIGN PATENT DOCUMENTS

DE 19707307 8/1997
EP 2497692 9/2012
(Continued)

OTHER PUBLICATIONS

French Search Report for French Application No. FR 1501443, Completed by the French Patent Office on May 2, 2016, 7 Pages.

*Primary Examiner* — Mussa A Shaawat
*Assistant Examiner* — Abdhesh K Jha
(74) *Attorney, Agent, or Firm* — Brooks Kushman P.C.

(57) ABSTRACT

A control device including at least one control member for measuring an acceleration of an aircraft, for generating an inflation order, and for transmitting the inflation order to an inflation member, the inflation member serving to inflate at least one inflatable safety bag, the control device, the inflation member and the inflatable bag being arranged together on a single seat of the aircraft. Such a control device includes at least one readying system connected to the at least one control member, the readying system comprising: at least a first sensor suitable for continuously measuring a first current acceleration of the aircraft relative to at least one axis; and at least one switch that is controllable as a function of the first current acceleration of the aircraft as measured by the first sensor.

15 Claims, 3 Drawing Sheets

(51) Int. Cl.
*B64D 25/06* (2006.01)
*B64D 25/04* (2006.01)

(52) U.S. Cl.
CPC ............ *B64D 25/04* (2013.01); *B64D 25/06* (2013.01); *B64D 2201/00* (2013.01); *B64D 2221/00* (2013.01)

(56) References Cited

U.S. PATENT DOCUMENTS

| | | | |
|---|---|---|---|
| 5,779,264 A | 7/1998 | De Mersseman et al. | |
| 6,226,578 B1 * | 5/2001 | Willerton | B60R 21/017 280/734 |
| 8,540,275 B2 * | 9/2013 | Kokeguchi | B64D 11/06205 280/729 |
| 2015/0001837 A1 * | 1/2015 | Gluck | B60R 21/01558 280/735 |

FOREIGN PATENT DOCUMENTS

| | | | |
|---|---|---|---|
| EP | 2497692 A1 * | 9/2012 | ......... B60R 21/0132 |
| WO | 9915368 | 4/1999 | |

\* cited by examiner

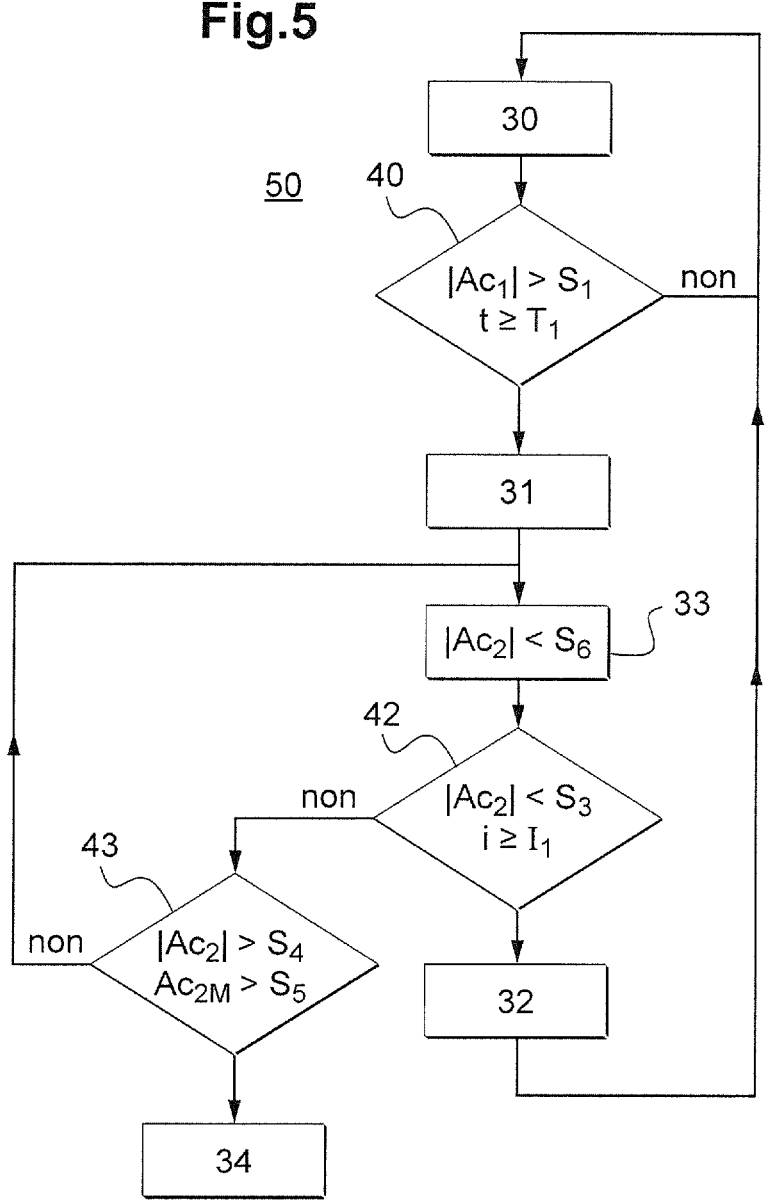

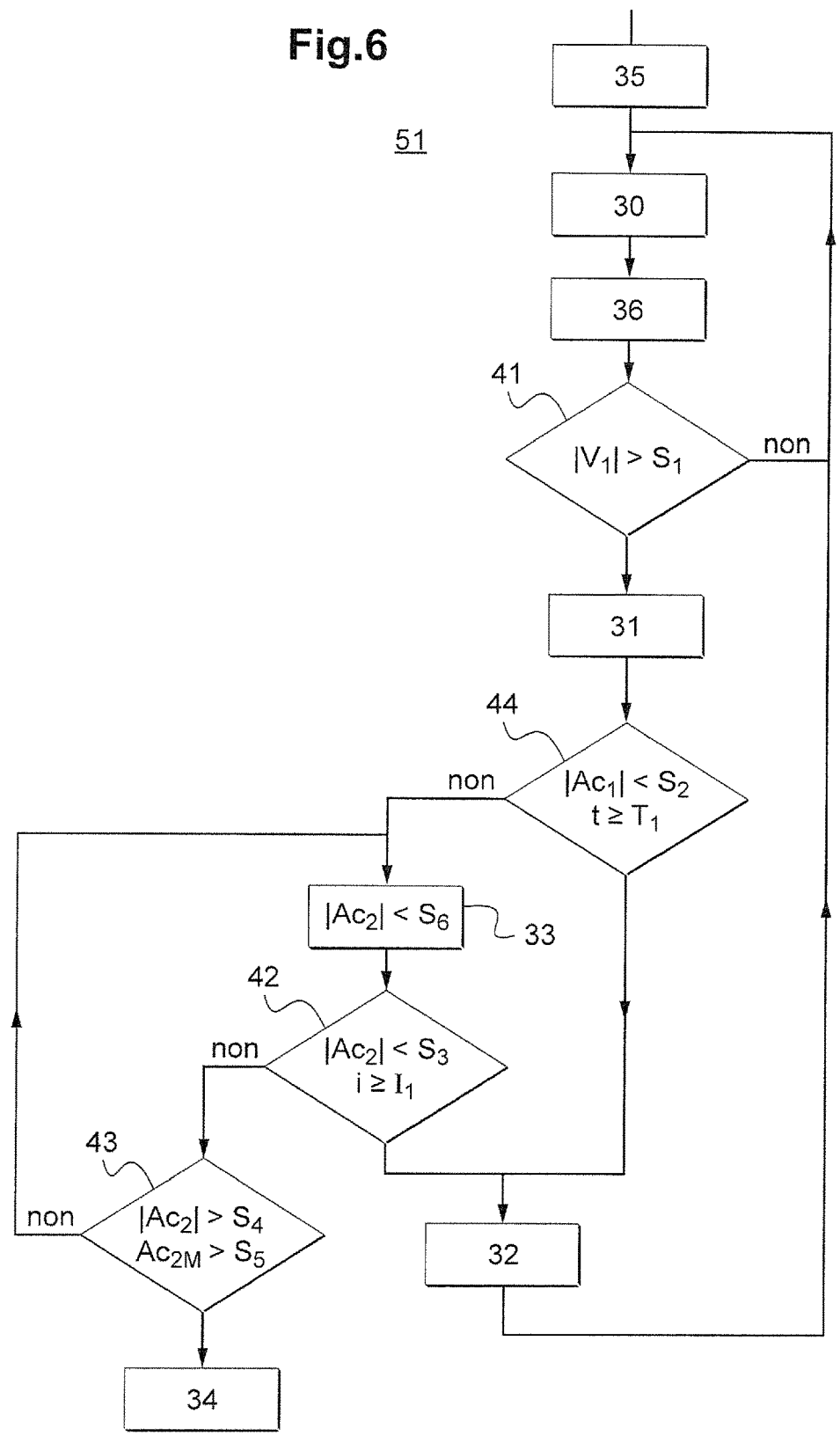

AIRCRAFT HAVING AT LEAST ONE CONTROL DEVICE FOR CONTROLLING INFLATION OF AN INFLATABLE SAFETY BAG, AND AN ASSOCIATED METHOD OF CONTROLLING INFLATION OF AN INFLATABLE SAFETY BAG

CROSS REFERENCE TO RELATED APPLICATION

This application claims priority to French patent application No. FR 15 01443 filed on Jul. 8, 2015, the disclosure of which is incorporated in its entirety by reference herein.

BACKGROUND OF THE INVENTION (1) Field of the Invention

The present invention relates to an aircraft having at least one device for controlling inflation of an inflatable bag, commonly referred to as an "airbag". Such a device is associated with a seat of an aircraft, such as for example an airplane, a rotorcraft, or indeed more particularly a helicopter. Thus, such a device serves to control inflation of an airbag likewise associated with the seat. In practice, such an airbag may be arranged by way of example on a safety harness that serves to hold an occupant of the aircraft in a sitting position on the seat, in particular in the event of an accident.

Consequently, each of the seats of the aircraft that is fitted with at least one airbag may include its own control device in accordance with the invention.

The invention also relates to an aircraft fitted with such a control device and to a method of controlling the inflation of an inflatable safety bag.

(2) Description of Related Art

In known manner, devices for controlling the inflation of an inflatable bag include control members having detector means for measuring the acceleration of the aircraft relative to at least one axis, and analysis means for identifying whether an accident of the aircraft is imminent. Where necessary, such analysis means then generate an order to inflate an inflation member in order to inflate the inflatable bag(s) of the aircraft seat.

Nevertheless, such control members need to be powered electrically and they consume a considerable quantity of electricity. Such electricity consumption can be problematic, since as a general rule, it is not possible to connect the control device of each seat electrically to a centralized source of electricity produced by the power plant of the aircraft.

Such a configuration may arise in particular in an aircraft when it is problematic to pass a wiring harness under the floor of the aircraft. By way of example, in rotorcraft in general, and in helicopters in particular, tanks for storing fuel are generally arranged immediately under the floor of the cabin and/or the cockpit.

Positioning and installing an electrical harness under the floor in order to power each of the seats of the aircraft would then have the consequence of reducing the available volume for storing fuel and/or of making the shape and the manufacture of fuel tanks more complex.

Furthermore, in order to power each control device via an electrical harness arranged under the floor of the aircraft, it would be necessary to provide a plurality of openings in the floor for passing electric cables for electrically powering the various control devices that are arranged above the floor. Such a plurality of openings would then have the effect of weakening the floor structure of the aircraft, which is problematic and would very likely require the thickness of the floor to be increased, and thus require its weight to be increased.

Thus, in order to avoid using an electrical harness for providing electrical power, it is possible for each of the seats to make use of an independent source of electricity, such as a battery.

Such batteries are then constantly connected to the control members and to the members for inflating the airbag(s). This results in a large amount of electricity being consumed. Such an arrangement then makes it necessary either to use batteries that are heavy and bulky but that present considerable operating lifetime, or else to undertake lengthy maintenance operations with short intervals between two operations, firstly for the purpose of verifying the level of charge in the batteries and secondly also for recharging them.

Furthermore, and as described in Document WO 99/15368, it is also known to reduce the electricity consumption of the control member for measuring an acceleration of an aircraft by connecting the source of electricity to the control device only while the buckles of the safety belt are connected together.

Nevertheless, such a solution consumes electricity for powering the control member as soon as the safety belts are buckled, and not only when a potentially dangerous situation has been identified by the control device.

In addition, and as described in Document EP 2 497 692 in the field of steering wheel airbags for motor vehicles, it is also known to use a first sensor continuously measuring a first current acceleration and a switch that is controllable as a function of the first current acceleration in order to activate and deactivate the control member.

Under such circumstances, a first low voltage electrical sensor acts continuously to detect the acceleration of the vehicle in a standby mode, and a second sensor acts occasionally to detect the acceleration of the vehicle only when a risk of an accident has been identified, which corresponds to an operational mode. Such a standby mode is used for the purpose of saving electricity consumption by the airbag control member by normally not making use of the second acceleration sensor to measure the acceleration of the motor vehicle.

Nevertheless, under such circumstances, the return from the operational mode to the standby mode, in which only the first sensor is in operation, takes place only after a predetermined duration. Such a solution is therefore not optimized in terms of limiting the electricity consumption of such a control system in the event of no risk of accident being detected. Specifically, such a solution is content to remain in the operational mode for a predetermined duration that is necessarily much longer than the occurrence of a risk of an accident, in order to be able to detect that risk.

Furthermore, Document DE 197 07 307 describes another device for controlling a motor vehicle airbag that has two acceleration sensors that are constantly powered electrically. Such a device thus consumes a particularly large amount of electricity and is therefore not adapted for use with a device for controlling inflation that is arranged on an aircraft seat.

BRIEF SUMMARY OF THE INVENTION

An object of the present invention is thus to propose an aircraft having at least one device for controlling inflation of an airbag, and also a method of controlling inflation of an airbag, that make it possible to overcome the above-mentioned limitations. Such an invention makes it possible to limit the consumption of electricity supplied by a source of electricity to the members for controlling and inflating airbags. Such an advantage provided by the invention can then also have as its direct consequence the spacing apart of maintenance operations needed for verifying the level of charge and/or for recharging sources of electricity that are used for electrically powering such control devices.

The invention thus provides an aircraft fitted with at least one control device having at least one control member for measuring an acceleration of the aircraft, for generating an inflation order, and for transmitting the inflation order to an inflation member. Such an inflation member serves to inflate at least one inflatable safety bag.

In addition, the control device together with the inflation member and the inflatable bag are arranged together on a single seat of the aircraft.

The control device includes at least one readying system connected to the control member, the readying system comprising:

at least one first sensor continuously measuring a first current acceleration of the aircraft relative to at least one axis, the control member providing a measurement of the acceleration of the aircraft that is independent of the first current acceleration of the aircraft as measured by the first sensor; and at least one controllable switch that is controllable as a function of the first current acceleration of the aircraft as measured by the first sensor, such a controllable switch serving to activate and deactivate the control member by connecting and disconnecting a source of electricity to the control member.

The term "control member" is used to designate at least one member enabling at least one other measurement to be made of the acceleration of the aircraft that is distinct from, and independent of, the first current acceleration of the aircraft as measured by the first sensor.

The measurement of the acceleration of the aircraft as obtained by means of the control member can then advantageously present a characteristic that is distinct from the measurement obtained by means of the first sensor. In a particular embodiment, such a distinct characteristic may be selected from the group comprising speed, fidelity, sensitivity, and accuracy of the measurement of the acceleration of the aircraft.

In other words, the controllable switch of the readying system serves to close a circuit for electrically powering the control member when a risk of accident has been detected by the first sensor. In contrast, while the aircraft is subject to normal operating acceleration, such an electrical power supply circuit remains open and the control member does not consume electricity.

Thus, the measurement of the first current acceleration of the aircraft serves solely to control the controllable switch of the readying system. In contrast, the measurement of the acceleration of the aircraft that is obtained by means of the control member serves in particular to cause the inflatable bag to be inflated if certain acceleration thresholds are exceeded.

Consequently, such a first sensor provides a continuous measurement (i.e. a permanent measurement) of a first current acceleration of the aircraft while in flight and/or while the aircraft is moving.

In contrast, the control member supplying a measurement of the acceleration of the aircraft does not perform such measurement continuously, but rather intermittently, i.e. over a limited period of time, only when the measurement of the first current acceleration of the aircraft taken by the first sensor serves to identify that a risk of an accident is imminent.

Furthermore, when the risk of an accident is no longer detected as being imminent, the control member can be deactivated in order to avoid continuing to consume electricity pointlessly. In addition, such an imminent risk of an accident can be determined when the control member includes at least one second sensor suitable for measuring, at least temporarily, a second current acceleration of the aircraft relative to at least one axis.

Such a second sensor may thus be of the same type as the first sensor. Nevertheless, and as mentioned above, such a second sensor may in practice be selected so as to take a measurement that presents a characteristic that is distinct relative to the measurement from the first sensor. In addition, such a distinct characteristic may consist in greater accuracy, greater speed, greater reliability, or indeed greater sensitivity. Such a second sensor may also be of the active type and may be electrically connected to the source of electricity when the controllable switch is closed.

According to the invention, the aircraft is remarkable in that the control member includes at least one computer for comparing the absolute value of the second current acceleration of the aircraft with a third acceleration threshold and for causing the controllable switch to open in order to disconnect the source of electricity from the control member when the absolute value of the second current acceleration of the aircraft is less than the third acceleration threshold for a predetermined number of comparison iterations performed by the computer between the absolute value of the second current acceleration of the aircraft and the third acceleration threshold.

Such a computer also makes it possible to count iterations of comparing the absolute value of the second current acceleration of the aircraft while it is below the third acceleration threshold. This counting of comparison iterations can also be reset to zero each time the absolute value of the second current acceleration of the aircraft passes back over the third acceleration threshold.

In this way, it is possible to control the supply of electrical power to the control member by comparing the second current acceleration of the aircraft with the third acceleration threshold, it being understood that the measurement accuracy of the second current acceleration may be greater than that of the first current acceleration.

Furthermore, like the second acceleration threshold and by way of example, such a third acceleration threshold may be close to the acceleration due to terrestrial gravity, i.e. 1 g. Thus, if the absolute value of the current second acceleration of the aircraft relative to at least one axis is less than 1 g, for example, for 500 comparison iterations performed by the computer, then the computer generates a control order and transmits it to the controllable switch so as to interrupt the supply of electrical power to the control member and thereby deactivate it.

Advantageously, the controllable switch may connect a source of electricity to the control member when the absolute value of the first current acceleration of the aircraft becomes greater than a first acceleration threshold.

Thus, in a particular embodiment of the invention, the controllable switch may close automatically so as to power the control member electrically by connecting it to the source of electricity as soon as a risk of accident is detected by the first sensor, which detection corresponds to the instant at which the first acceleration threshold is exceeded.

In another embodiment of the invention, a risk of an accident can also be detected by the first sensor if a first acceleration threshold continues to be exceeded for a predetermined duration, e.g. several milliseconds.

Typically, so long as the absolute value of the acceleration of the aircraft in three-dimensional space around the aircraft remains less than the first acceleration threshold, e.g. for a relative acceleration of 2 g (corresponding to twice the acceleration g due to terrestrial gravity), the control member is deactivated. Such relative acceleration is defined as being the acceleration of the aircraft as measured in a moving reference frame associated with the aircraft so as to exclude the acceleration of terrestrial gravity from its value.

Furthermore, the source of electricity may be a central electricity source of the aircraft enabling a plurality of control devices to be powered, or it may be an independent electricity source such as a battery dedicated to a single control device.

In practice, the readying system may include damper means for damping the first current acceleration of the aircraft as measured by the first sensor, the damper means serving to filter a measurement of the first current acceleration of the aircraft, the controllable switch connecting the source of electricity to the control member when the measurement of the first current acceleration of the aircraft is greater in absolute value than the first acceleration threshold.

Thus, the damper means may make it possible to process or filter the measurement taken by the first sensor in order to avoid triggering activation of the control member by the controllable switch. Such damper means may thus consist in a highpass filter filtering out variations in acceleration that are too slow. Such an embodiment is advantageous for filtering out low variations of acceleration such as turning sequences of the aircraft at a high level of acceleration, which can reach 2 g relatively slowly relative to at least one axis. Such a duration representative of slow variation of the acceleration of the aircraft may in particular be longer than 100 milliseconds. It is thus possible to avoid untimely activation of the control member since there is then no risk of accident for the aircraft.

Furthermore, the controllable switch may also disconnect the source of electricity from the control member when the absolute value of the first current acceleration of the aircraft is less than a second acceleration threshold for a predetermined duration.

In other words, the second acceleration threshold is less than the first acceleration threshold, and by way of example it may be about 1 g. Thus, if the absolute value of the first current acceleration of the aircraft relative to at least one axis is less than 1 g for example, for a period of 500 milliseconds, then the controllable switch is controlled so as to deactivate the control member.

In practice, the computer may also compare the absolute value of the second current acceleration of the aircraft with a fourth acceleration threshold and may compare the mean value of the second current acceleration of the aircraft over a predetermined time interval with a fifth acceleration threshold. The computer can then generate the inflation order and then transfer it to the inflation member when, firstly, the absolute value of the second current acceleration of the aircraft is greater than the fourth acceleration threshold, and, secondly, the mean value of the second current acceleration of the aircraft over the predetermined time interval is greater than the fifth acceleration threshold.

In other words, so long as the absolute value of the second current acceleration of the aircraft remains less than the fourth acceleration threshold, and the mean value of the second current acceleration of the aircraft over a predetermined time interval remains less than the fifth acceleration threshold, than the control member does not cause the airbag of the seat on which it is arranged to be inflated. Such a computer also makes it possible in parallel to execute a plurality of algorithms for measuring and comparing the second current acceleration of the aircraft in translation and in rotation relative to three mutually orthogonal axes defining a reference frame associated with the aircraft. Specifically, an acceleration may be linear and produced by a movement in translation or it may be angular and produced by a movement in rotation.

Furthermore, in vector terms, the second current acceleration of the aircraft possesses three pure vector components at each instant, i.e. components oriented solely along a respective single direction parallel to the three axes defining the reference frame associated with the aircraft, and combined vector components, i.e. components each orientated along two directions parallel to one of the three axes defining the reference frame associated with the aircraft.

Thus, at each instant, the computer can perform a plurality of algorithms in parallel to measure and compare the pure vector components of the second current acceleration of the aircraft. Each algorithm performed by the computer can then use as input data at least one of the three pure vector components of the second current acceleration of the aircraft. When each algorithm uses only one pure vector component, detection is then said to be "pure". In contrast, when each algorithm makes use simultaneously of combined vector components, detection is then said to be "combined".

The measurement and comparison of so-called "pure" and "combined" accelerations performed simultaneously in parallel by dedicated algorithms thus enables the computer to have great reactivity for the purpose of identifying a risk of an imminent accident, where appropriate.

Thus, when the computer of the control member detects that the absolute value of the second current acceleration of the aircraft is greater than the fourth acceleration threshold, e.g. equal to 9 g, and that the mean value of the second current acceleration of the aircraft is greater than the fifth threshold, e.g. equal to 5 g, for 15 milliseconds, it generates an inflation order and sends it to the inflation member, thus enabling the inflatable bag to be inflated almost instantly.

In a particular implementation, the control member may include at least one memory serving to store at least data representative of the third and/or fourth and/or fifth acceleration thresholds.

Thus, such a memory can serve to save data representative of the third, fourth, and fifth acceleration thresholds between two missions or throughout the time the aircraft is in use. Under such circumstances, each memory may be set once and for always when the control device is fabricated, prior to being assembled in the aircraft. In practice, the third, fourth, and fifth acceleration thresholds may also be modified, if necessary, during a maintenance operation of the aircraft.

Finally, in another implementation, data contained in the memory may also be modified on each mission. Thus, the third, fourth, and fifth acceleration thresholds may be changed prior to using the aircraft in order to comply with special safety requirements of a mission. Safety requirements may vary, e.g. if the mission is a mission of transporting personnel or a mission of testing the aircraft for the purpose of evaluating the capabilities of the aircraft, in particular in terms of acceleration.

Advantageously, the first sensor may be formed by a mechanical sensor suitable for measuring an acceleration relative to at least one axis.

In other words, the first sensor has a flyweight that is movable in translation or in rotation and resilient return means for opposing an inertia force during linear or angular acceleration of the sensor relative to at least one axis.

Furthermore, such a mechanical sensor presents auxiliary means for the purpose of measuring the movements of the flyweight, which means may be optical, magnetic, or electrical, for example.

Furthermore, in another implementation, the first sensor and the second sensor may be selected from the group comprising micro-electromechanical systems (MEMS) and nano-electromechanical systems (NEMS) suitable for measuring acceleration relative to at least one axis.

Under such circumstances, the first sensor and the second sensor serve to measure a linear or angular acceleration relative to at least one axis, while also being miniaturized. Such miniaturization is also advantageous since it makes it possible to guarantee maximum measurement accuracy regardless of the direction in which acceleration is detected.

Specifically, because of the low mass of their moving weights, such miniaturized first and second sensors are less sensitive to internal friction than conventional mechanical sensors in which the movement of the flyweight may be subjected to significant friction forces depending on the direction of acceleration of the aircraft.

In practice, the second sensor may be saturated so as to measure an acceleration relative to at least one axis (X, Y, Z) solely below a sixth acceleration threshold that is selected to be greater than or equal to the fourth acceleration threshold.

Above this sixth acceleration threshold, the acceleration of the aircraft is no longer measured. Naturally, such a sixth threshold is selected to be greater than or equal to the fourth acceleration threshold at which the order for inflating the airbag(s) of the aircraft seat is generated.

Such saturation of the second sensor is also advantageous since it makes it possible to avoid accidental inflation of the airbag(s). Specifically, this saturation of the second sensor makes it possible to avoid detecting high levels of acceleration, e.g. due to involuntary jolts such as a seat being kicked or baggage impacting against a seat.

The invention also relates to a method of controlling the inflation of at least one inflatable safety bag arranged on at least one aircraft seat. Such a control method includes at least a measurement step consisting in measuring an acceleration of the aircraft, and a step consisting in generating an inflation order and transmitting this inflation order to a member for inflating the inflatable bag.

In addition, the method comprises:

a preliminary measurement step performed by at least one first sensor, the preliminary measurement step consisting in continuously measuring a first current acceleration of the aircraft relative to at least one axis, the measurement step serving to provide a measurement of the acceleration of the aircraft independent of the first current acceleration of the aircraft; and an activation step and a deactivation step for activating and deactivating a control member enabling the step to be performed that consists in generating an inflation order and in transmitting the inflation order to the inflation member for inflating the inflatable bag, the activation step and the deactivation step being performed by electrically connecting and disconnecting a source of electricity relative to the control member.

Such steps of activating and deactivating the control member can thus be performed automatically by means of a controllable switch that is controllable as a function of the measurement of the first current acceleration of the aircraft.

In addition, such a measurement step is performed by the control member and serves to measure, at least temporarily, a second current acceleration of the aircraft relative to at least one axis.

In this way, the control member may include a second acceleration sensor. Such a second sensor is advantageously selected to be faster, more accurate, or more reliable than the first acceleration sensor for measuring the first current acceleration of the aircraft.

According to the invention, such a method is remarkable in that the absolute value of the second current acceleration of the aircraft is compared with a third acceleration threshold and the controllable switch is caused to open so as to disconnect the source of electricity from the control member when the absolute value of the second current acceleration of the aircraft is less than the third acceleration threshold for a predetermined number of comparison iterations between the absolute value of the second current acceleration of the aircraft and the third acceleration threshold.

Specifically, when it is observed that the absolute value of the second current acceleration passes below the third acceleration threshold, it is certain that the acceleration of the aircraft has returned to a stable level and that an accident is not imminent. It is then possible to count the number of comparison iterations corresponding to calculation loops in an algorithm where the absolute value of the second current acceleration of the aircraft is less than the third acceleration threshold, and to switch off the electrical power supply to the control member by opening the controllable switch of the readying system when the number of iterations reaches a predetermined number of comparison iterations.

Advantageously, it is then possible to compare the absolute value of the first current acceleration of the aircraft with a first acceleration threshold, and the source of electricity may be connected to the control member when the absolute value of the first current acceleration of the aircraft is greater than the first acceleration threshold.

In other words, so long as the absolute value of the first current acceleration of the aircraft is less than the first acceleration threshold, the controllable switch is left open. When the absolute value of the first current acceleration of the aircraft exceeds the first acceleration threshold, the controllable switch may be closed, thereby activating the control member, which is electrically connected to the source of electricity.

In practice, a measurement of the first current acceleration of the aircraft may be filtered and the measurement of the first current acceleration of the aircraft may be compared with the first acceleration threshold, and the source of electricity may be connected to the control member when the measurement of the first current acceleration of the aircraft is greater, in absolute value, than the first acceleration threshold.

In other words, so long as the first current acceleration of the aircraft is varying slowly, the signal is filtered and the controllable switch is left open. When the first current acceleration of the aircraft is varying more quickly, a filtered measurement of the first current acceleration of the aircraft is then compared with the first acceleration threshold. As before, when this filtered measurement exceeds the first acceleration threshold, the controllable switch is closed and consequently the control member is activated by being connected to the source of electricity.

As mentioned above, it is also possible to disconnect the source of electricity from the control member when the absolute value of the first current acceleration of the aircraft is less than a second acceleration threshold during a predetermined duration.

Thus, under such circumstances, the absolute value of the first current acceleration of the aircraft is compared with a second acceleration threshold, and if it remains below this second acceleration threshold for a predetermined duration, the controllable switch is opened. This serves to disconnect the electrical power supply to the control member of the aircraft, thereby deactivating the control member.

It is also possible to compare the absolute value of the second current acceleration of the aircraft with a fourth acceleration threshold and to compare the mean value of the second current acceleration of the aircraft over a predetermined time interval with a fifth acceleration threshold. It is then possible to generate the inflation order and transfer it to the inflation member when, firstly, the absolute value of the second current acceleration of the aircraft is greater than the fourth acceleration threshold and, secondly, the mean value of the second current acceleration of the aircraft over the predetermined time interval is greater than the fifth acceleration threshold.

In other words, so long as the absolute value of the second current acceleration of the aircraft is less than the fourth acceleration threshold, the control member is allowed to generate in parallel comparison algorithms for seeking to identify the fourth acceleration threshold being exceeded. If such identification occurs, then the mean value of the second current acceleration of the aircraft over a predetermined time interval is compared with the fifth acceleration threshold, and the airbag is caused to be inflated if this mean value over the predetermined time interval is greater than the fifth acceleration threshold.

In practice, the method may include a step of storing in at least one memory data that is representative of the third, fourth, and fifth acceleration thresholds, such a memory forming an integral portion of the control member.

In other words, as mentioned above, it is then possible to conserve the data representing the third, fourth, and fifth acceleration thresholds between two missions or throughout the time the aircraft is in use.

BRIEF DESCRIPTION OF THE SEVERAL VIEWS OF THE DRAWINGS

The invention and its advantages appear in greater detail from the context of the following description of examples given by way of illustration with reference to the accompanying figures, in which:

FIGS. 5 and 6 are two flow charts showing two methods of controlling the inflation of an inflatable bag in accordance with the invention.

Elements present in more than one of the figures may be given the same references in each of them.

DETAILED DESCRIPTION OF THE INVENTION

Figure 4:
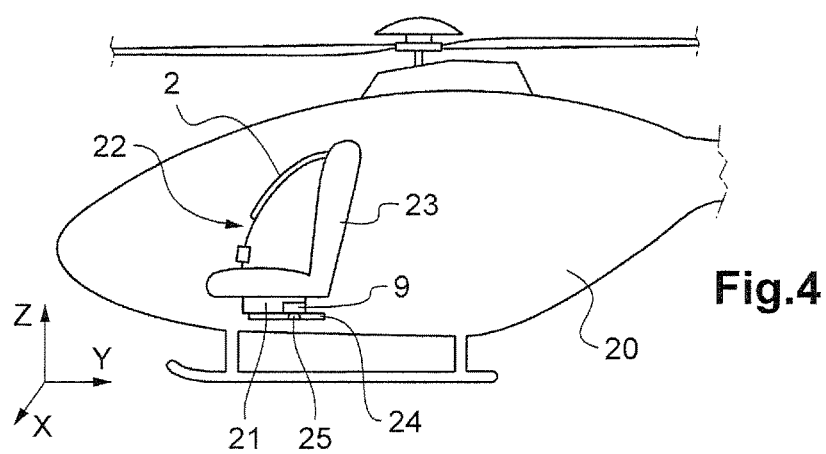
FIG. 4 is a fragmentary side view of an aircraft in accordance with the invention.

As mentioned above, and as shown in FIG. 1, the invention relates to a device 1 for controlling the inflation of at least one inflatable safety bag 2. As shown in FIG. 4, such an inflatable bag or "airbag" 2 may be arranged on a safety harness 22 for the seat 23 of an aircraft 20.

Advantageously, such an aircraft 20 may be an airplane, a rotorcraft, or indeed more particularly, and as shown diagrammatically in FIG. 4, a helicopter.

Firstly, three mutually orthogonal axes X, Y, and Z are shown in FIG. 4 and serves to define the movement of the aircraft in translation along three directions or in rotation about the axes.

Such an orthogonal reference frame thus serves to define the orientation of linear acceleration or of angular acceleration of the aircraft 20, or indeed the dynamic torsor of such an aircraft 20.

Figure 1:
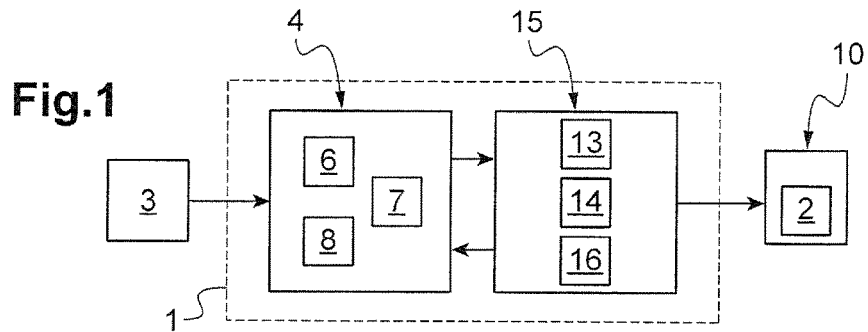
FIGS. 1 to 3 are structural diagrams showing three variants of devices in accordance with the invention for controlling the inflation of inflatable bags.

As shown in FIG. 1, the control device 1 includes a control member 15 for measuring an acceleration of the aircraft 20, for generating an inflation order, and for transmitting it to an inflation member 10. The inflation member 10 then serves to inflate an inflatable bag 2.

In this first variant of the invention shown in FIG. 1, the control device 1 has a readying system 4 with a first sensor 7 for constantly measuring a first current acceleration $A_{C1}$ of the aircraft 10 relative to at least one axis X, Y, Z. By way of example, such a first sensor 7 may be formed by a mechanical sensor for measuring the movement of a flyweight as a function of the first current acceleration $A_{C1}$ of the aircraft 20.

The readying system 4 also has a controllable switch 6 that acts as a function of the value of the first current acceleration $A_{C1}$ to connect the control member 5 to a source 3 of electricity, or to disconnect it therefrom.

Such a source 3 of electricity may in particular be independent and dedicated to a seat 23. Nevertheless, in other variants in accordance with the invention, such a source 3 of electricity may also be centralized and common to a plurality of control devices 1.

Thus, so long as the absolute value of the first current acceleration $A_{C1}$ remains below a first acceleration threshold $S_1$, the controllable switch 6 remains open.

Nevertheless, when the absolute value of the first current acceleration $A_{C1}$ becomes greater than a first acceleration threshold $S_1$, the controllable switch 6 closes so as to allow electricity to reach the control member 15.

Such a readying system 4 thus serves to limit the electricity consumption of the control member 15 as a function of the absolute value of the first current acceleration $A_{C1}$ as measured by the first sensor 7.

Figure 2:
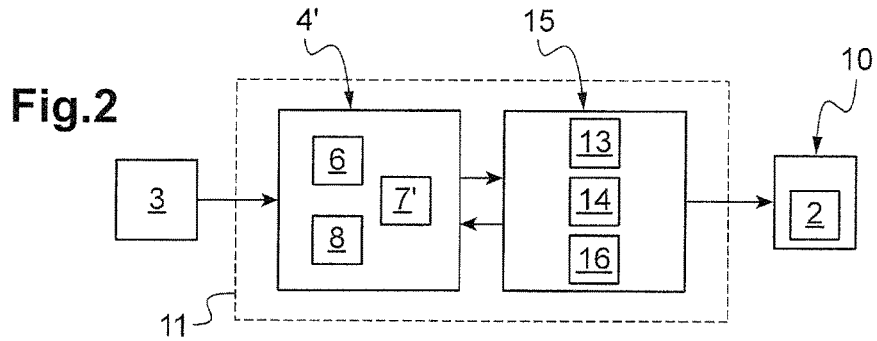

In another variant, as shown in FIG. 2, the control device 11 may include a readying system 4' having a first sensor 7' that, in this other variant, may for example be formed by a sensor selected from the group comprising micro-electromechanical systems (MEMS) and nano-electromechanical systems (NEMS) suitable for measuring acceleration relative to at least one axis X, Y, Z.

Furthermore, in a particular embodiment and as shown in FIGS. 1 and 2, the readying system 4, 4' may also include damper means 8 for damping a measurement of the first current acceleration $A_{C1}$. These damper means 8 then serve to filter a measurement $V_1$ of the first current acceleration $A_{C1}$. It is then possible to compare the absolute value of this measurement $V_1$ with the first acceleration threshold $S_1$. When the measurement $V_1$ is greater, in absolute value, than the first acceleration threshold $S_1$, then the controllable switch 6 is closed in order to elastically connect the source 3 of electricity to the control member 5.

As shown in FIGS. 1 and 2, the control member 15 includes in particular a second sensor 13 suitable for measuring, at least temporarily, a second current acceleration $A_{C2}$ of the aircraft 20 relative to at least one axis X, Y, Z. Such a second sensor 13 is advantageously of the miniaturized type such as a MEMS and serves to take a very accurate and fast measurement of the second current acceleration $A_{C2}$ of the aircraft 20.

Under such circumstances, it is then possible to envisage subsequently opening the controllable switch 6 in order to disconnect the source 3 of electricity from the control member 15 when the absolute value of the second current acceleration $A_{C2}$ becomes less than a third acceleration threshold $S_3$ and remains less than the third acceleration threshold $S_3$ for a predetermined number $I_1$ of comparison iterations i performed by a computer 14.

Specifically, such a control device 1, 11 may also include a computer 14 for iteratively comparing the absolute value of the second current acceleration $A_{C2}$ of the aircraft 20 or its mean value $A_{C2M}$ over a predetermined time interval with various acceleration thresholds.

Thus, the computer 14 serves to compare the absolute value of the second current acceleration $A_{C2}$ with the third acceleration threshold $S_3$ or indeed with a fourth acceleration threshold $S_4$. Furthermore, the control device 1, 11 may generate an inflation order and transmit this order to the inflation member 10 when simultaneously the absolute value of the second current acceleration $A_{C2}$ is greater than the fourth acceleration threshold $S_4$ and the mean value $A_{C2M}$ of the second current acceleration $A_{C2}$ over a predetermined time interval is greater than a fifth acceleration threshold $S_5$.

Furthermore, the second sensor 13 may be of the saturated type so as to deliver a measurement of the second current acceleration $A_{C2}$ only below a sixth acceleration threshold $S_6$ that is selected to be higher than the fourth acceleration threshold $S_4$.

Furthermore, and as shown, the control device 1, 11 may also include a memory 16 for storing data representative of the third, fourth, and fifth acceleration thresholds $S_3$, $S_4$, and $S_5$.

Figure 3:
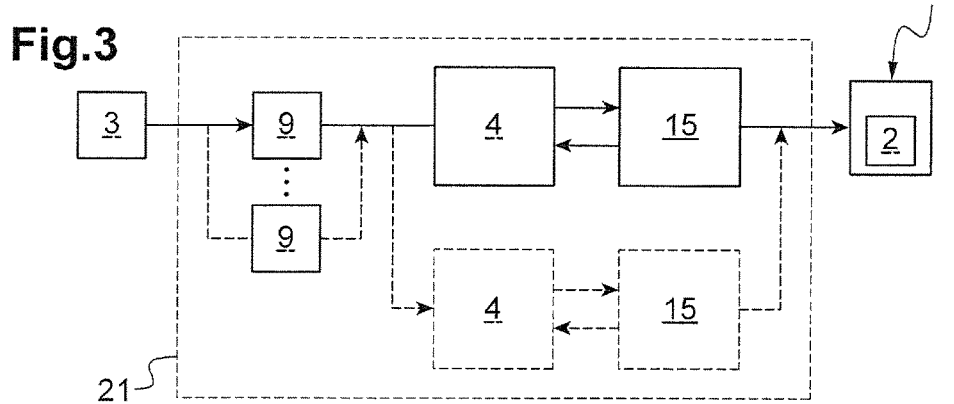

As shown in FIG. 3, in a third variant, the control device 21 may also include a maintenance switch 9 enabling the source 3 of electricity to be disconnected manually from the readying system 4 and/or the control member 15 while performing maintenance operations on the aircraft 20.

Furthermore, it is also possible to envisage increasing the safety of such a control device 21 by providing redundancy for the maintenance switch 9 and/or the readying system 4 and/or the control member 15.

As shown in FIG. 4, and as mentioned above, the invention also provides an aircraft 20, such as a helicopter for example. Such an aircraft 20 is then remarkable in that it includes a device 21 for controlling the inflation of an inflatable bag 2, e.g. fitted to a safety harness 22 of a seat 23.

Such a control device 21 may include in particular a maintenance switch 9 that is actuated magnetically while the seat 23 is being put into place on a guide rail 24 by magnetic means 25 that are secured to the guide rail 24.

Thus, when the seat 23 is removed from its guide rail 24 for a maintenance operation, the maintenance switch 9 is moved away from the magnetic means 25 and opens the electric circuit enabling the readying system 4 and/or the control member 15 to be powered electrically.

Finally, and as shown in FIGS. 5 and 6, the invention also provides a method 50, 51 for controlling the inflation of an inflatable safety bag 2.

Thus, and as shown, the method 50, 51 includes a preliminary measurement step 30 of measuring a first current acceleration $A_{C1}$ of the aircraft 20 relative to at least one axis X, Y, Z. A first comparison step 40 then makes it possible to identify whether the first current acceleration $A_{C1}$ of the aircraft 20 is less than or greater than a first acceleration threshold $S_1$.

As shown in FIG. 5, when the absolute value of the first current acceleration $A_{C1}$ is greater than a first acceleration threshold $S_1$, the method 50 activates a step 31 of activating a control member 15 by electrically connecting a source 3 of electricity to the control member 15. Such a connection can thus be performed by means of a controllable switch 6 that is closed in order to enable the control member 15 to be powered electrically.

When the absolute value of the first current acceleration $A_{C1}$ is less than the first acceleration threshold $S_1$, the preliminary measurement step 30 measures the first current acceleration $A_{C1}$ of the aircraft 20 relative to at least one axis X, Y, Z.

Thereafter, the method performs a step 33 of measuring a second current acceleration $A_{C2}$ of the aircraft 20 by means of a second sensor 13. Such a second sensor 13 may also be saturated, i.e. it may serve to provide a measurement limited to a sixth acceleration threshold $S_6$ so as to avoid taking account of instantaneous accelerations of very great absolute value. The measurement step 33 then serves to provide a measurement of the second current acceleration $A_{C2}$ of the aircraft 20 that is less than or equal to the sixth acceleration threshold $S_6$.

In a step 42, the absolute value of this second current acceleration $A_{C2}$ is then compared with a third acceleration threshold $S_3$.

Thus, if the second current acceleration $A_{C2}$ remains less than the third acceleration threshold $S_3$ for a predetermined number $I_1$ of comparison iterations i, a deactivation step 32 for deactivating the control member 15 disconnects the source 3 of electricity from the control member 15. Such a disconnection can thus be performed by means of a controllable switch 6 that is opened to prevent the control member 15 being powered electrically.

Once the deactivation step 32 has been performed, the preliminary measurement step 30 then measures the first current acceleration $A_{C1}$ of the aircraft 20 relative to at least one axis X, Y, Z.

Nevertheless, if the absolute of the second current acceleration $A_{C2}$ is greater than the third acceleration threshold $S_3$, a comparison step 43 compares both the absolute value of the second current acceleration $A_{C2}$ to a fourth acceleration threshold $S_4$ and the mean value $A_{C2M}$ of the second current acceleration $A_{C2}$ over a predetermined time interval with a fifth acceleration threshold $S_5$.

If the absolute value of the second current acceleration $A_{C2}$ is greater than the fourth acceleration threshold $S_4$ and the mean value $A_{C2M}$ of the second current acceleration $A_{C2}$ over a predetermined time interval is greater than the fifth acceleration threshold $S_5$, the method 50 activates the following step 34, which consists in generating an inflation order and transmitting this inflation order to the member 10 for inflating the inflatable bag 2 since it has been identified that an accident of the aircraft 20 is imminent.

As shown in FIG. 6, the method 51 of controlling inflation of an inflatable bag 2 may also include a storage step 35 consisting in storing in a memory 16 data that is representative of the third, fourth, and fifth acceleration thresholds $S_3$, $S_4$, and $S_5$. Such a memory 16 then advantageously forms part of the control member 15.

In this second example, the method 51 includes a filtering step 36 of filtering a measurement $V_1$ of the first current acceleration $A_{C1}$ of the aircraft 20. Furthermore, this filtering step 36 is performed by the damper means 8 so as to avoid taking account of variations in the first current acceleration $A_{C1}$ that are too slow.

Thereafter, a comparison step 41 compares the absolute value of this measurement $V_1$ of the first current acceleration $A_{C1}$ with the first acceleration threshold $S_1$.

When the measurement $V_1$ is less than the first acceleration threshold $S_1$, the preliminary measurement step 30 measures the first current acceleration $A_{C1}$ of the aircraft 20 relative to at least one axis X, Y, Z.

In contrast, if the measurement $V_1$ of the first current acceleration $A_{C1}$ is of absolute value greater than the first acceleration threshold $S_1$, that indicates there is a risk of an accident for the aircraft 20. The method 51 then activates a step 31 of activating a control member 15 by connecting a source of electricity to the control member 15.

Furthermore, in this variant of the method 51, once the step 31 of activating the control member 15 has taken place, there is a step 44 of comparing the absolute value of the first current acceleration $A_{C1}$ of the aircraft 20 with a second acceleration threshold $S_2$.

If the first current acceleration $A_{C1}$ of the aircraft 20 is less than the second acceleration threshold $S_2$ for a predetermined duration $T_1$, then the method 51 performs a step 32 of deactivating the control member 15. As before, once the deactivation step 32 has been performed, the preliminary measurement step 30 then measures the first current acceleration $A_{C1}$ of the aircraft 20 relative to at least one axis X, Y, Z.

In contrast, if the absolute value of the first current acceleration $A_{C1}$ of the aircraft 20 is greater than the second acceleration threshold $S_2$, a measurement step 33 then measures a second current acceleration $A_{C2}$ of the aircraft 20 by means of a second sensor 14.

As in the method 50, the method 51 then includes a step 42 of comparing the absolute value of this second current acceleration $A_{C2}$ with a third acceleration threshold $S_3$.

The method 51 then continues in a manner identical to the method 50 as described above with reference to FIG. 5.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft having at least one control device with at least one control member for measuring an acceleration of the aircraft, for generating an inflation order, and for transmitting the inflation order to an inflation member, the inflation member serving to inflate at least one inflatable safety bag, the control device together with the inflation member and the inflatable safety bag being arranged together on a single seat of the aircraft, the control device including at least one readying system connected to the at least one control member, the at least one readying system comprising:

at least one first sensor continuously measuring a first current acceleration ($A_{C1}$) of the aircraft relative to at least one axis (X, Y, Z), the at least one control member providing a measurement of the acceleration of the aircraft that is independent of the first current acceleration ($A_{C1}$) of the aircraft as measured by the first sensor; and at least one controllable switch that is controllable as a function of the first current acceleration ($A_{C1}$) of the aircraft as measured by the first sensor, the controllable switch serving to activate and deactivate at least one control member by electrically connecting and disconnecting a source of electricity to the control member, the control member including at least one second sensor suitable for measuring, at least temporarily, a second current acceleration ($A_{C2}$) of the aircraft relative to at least one axis;

wherein the control member includes at least one computer for comparing the absolute value of the second current acceleration ($A_{C2}$) of the aircraft with a third acceleration threshold ($S_3$) and for causing the controllable switch to open in order to disconnect the source of electricity from the control member when the absolute value of the second current acceleration ($A_{C2}$) of the aircraft is less than the third acceleration threshold ($S_3$) for a predetermined number of comparison iterations ($I_1$) performed by the at least one computer between the absolute value of the second current acceleration ($A_{C2}$) of the aircraft and the third acceleration threshold ($S_3$).

2. The aircraft according to claim 1, wherein the controllable switch connects a source of electricity to the control member when the absolute value of the first current acceleration ($A_{C1}$) of the aircraft becomes greater than a first acceleration threshold ($S_1$).

3. The aircraft according to claim 2, wherein the at least one readying system includes damper means for damping the first current acceleration ($A_{C1}$) of the aircraft as measured by the first sensor, the damper means serving to filter a measurement ($V_1$) of the first current acceleration ($A_{C1}$) of the aircraft, the controllable switch connecting the source of electricity to the control member when the measurement ($V_1$) of the first current acceleration ($A_{C1}$) of the aircraft is greater in absolute value than the first acceleration threshold ($S_1$).

4. The aircraft according to claim 1, wherein the controllable switch disconnects the source of electricity from the control member when the absolute value of the first current acceleration ($A_{C1}$) of the aircraft is less than a second acceleration threshold ($S_2$) for a predetermined duration ($T_1$).

5. The aircraft according to claim 1, wherein the at least one computer compares the absolute value of the second current acceleration ($A_{C2}$) of the aircraft with a fourth acceleration threshold ($S_4$) and compares the mean value ($A_{C2M}$) of the second current acceleration ($A_{C2}$) of the aircraft over a predetermined time interval with a fifth acceleration threshold ($S_5$), the computer generates the inflation order and then transfers the inflation order to the inflation member when, firstly, the absolute value of the second current acceleration ($A_{C2}$) of the aircraft is greater than the fourth acceleration threshold ($S_4$), and, secondly, the mean value ($A_{C2M}$) of the second current acceleration ($A_{C2}$) of the aircraft over the predetermined time interval is greater than the fifth acceleration threshold ($S_5$).

6. The aircraft according to claim 5, wherein the control member includes at least one memory serving to store at least data representative of the third, fourth and fifth acceleration thresholds ($S_3$, $S_4$, $S_5$).

7. The aircraft according to claim 1, wherein the at least one first sensor is formed by a mechanical sensor suitable for measuring an acceleration relative to at least one axis.

8. The aircraft according to claim 1, wherein the at least one first sensor and the at least one second sensor are selected from the group consisting of micro-electromechanical systems (MEMS) and nano-electromechanical systems (NEMS) suitable for measuring acceleration relative to at least one axis (X, Y, Z).

9. The aircraft according to claim 5 wherein the at least one second sensor is saturated so as to measure an acceleration relative to at least one axis (X, Y, Z) solely below a sixth acceleration threshold ($S_6$) that is selected to be greater than or equal to the fourth acceleration threshold ($S_4$).

10. A control method for controlling inflation of at least one inflatable safety bag arranged on an aircraft seat in an aircraft, the control method including at least a measurement step consisting of measuring an acceleration of the aircraft and a step of generating an inflation order and of transmitting the inflation order to an inflation member enabling the at least one inflatable safety bag to be inflated, the control method comprising:
  a preliminary measurement step performed by at least one first sensor, the preliminary measurement step consisting in continuously measuring a first current acceleration ($A_{C1}$) of the aircraft relative to at least one axis (X, Y, Z), the measurement step providing a measurement of the acceleration of the aircraft independent of the first current acceleration ($A_{C1}$) of the aircraft; and
  an activation step and a deactivation step for activating and deactivating a control member enabling the step to be performed that consists of generating an inflation order and in transmitting the inflation order to the inflation member for inflating the at least one inflatable safety bag, the activation step and the deactivation step being performed by electrically connecting and disconnecting a source of electricity relative to the control member;
  the measurement step being performed via the control member and serving, at least temporarily, to measure a second current acceleration ($A_{C2}$) of the aircraft relative to at least one axis, wherein the absolute value of the second current acceleration ($A_{C2}$) of the aircraft is compared with a third acceleration threshold ($S_3$) ands a controllable switch is caused to open so as to disconnect the source of electricity from the control member when the absolute value of the second current acceleration ($A_{C2}$) of the aircraft is less than the third acceleration threshold ($S_3$) for a predetermined number of comparison iterations ($I_1$) between the absolute value of the second current acceleration ($A_{C2}$) of the aircraft and the third acceleration threshold ($S_3$).

11. The method according to claim 10, wherein the absolute value of the first current acceleration ($A_{C1}$) of the aircraft is compared with a first acceleration threshold ($S_1$), and the source of electricity is connected to the control member when the absolute value of the first current acceleration ($A_{C1}$) of the aircraft is greater than the first acceleration threshold ($S_1$).

12. The method according to claim 10, wherein a measurement ($V_1$) of the first current acceleration ($A_{C1}$) of the aircraft is filtered, the measurement ($V_1$) is compared with a first acceleration threshold ($S_1$), and the source of electricity is connected to the control member when the measurement ($V_1$) is greater, in absolute value, than the first acceleration threshold ($S_1$).

13. The method according to claim 10, wherein the source of electricity is disconnected from the control member when the absolute value of the first current acceleration ($A_{C1}$) of the aircraft is less than a second acceleration threshold ($S_2$) during a predetermined duration ($T_1$).

14. The method according to claim 10, wherein the absolute value of the second current acceleration ($A_{C2}$) of the aircraft is compared with a fourth acceleration threshold ($S_4$) and the mean value ($A_{C2M}$) of the second current acceleration ($A_{C2}$) of the aircraft over a predetermined time interval is compared with a fifth acceleration threshold ($S_5$), the inflation order is generated and the inflation order is then transferred to the inflation member when, firstly, the absolute value of the second current acceleration ($A_{C2}$) of the aircraft is greater than the fourth acceleration threshold ($S_4$) and, secondly, the mean value ($A_{C2M}$) of the second current acceleration ($A_{C2}$) of the aircraft over the predetermined time interval is greater than the fifth acceleration threshold ($S_5$).

15. The method according to claim 14, wherein the method includes a step of storing in at least one memory data that is representative of the third, fourth and fifth acceleration thresholds ($S_3$, $S_4$, $S_5$), the at least one memory forming an integral portion of the control member.

* * * * *